(12) United States Patent
Zhang et al.

(10) Patent No.: US 10,243,775 B2
(45) Date of Patent: Mar. 26, 2019

(54) DATA TRANSMISSION METHOD AND DEVICE

(71) Applicant: HUAWEI TECHNOLOGIES CO., LTD., Shenzhen, Guangdong (CN)

(72) Inventors: Shunqing Zhang, Shenzhen (CN); Lei Lu, Shanghai (CN); Yan Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 15/443,187

(22) Filed: Feb. 27, 2017

(65) Prior Publication Data

US 2017/0171011 A1 Jun. 15, 2017

Related U.S. Application Data

(63) Continuation of application No. PCT/CN2014/085551, filed on Aug. 29, 2014.

(51) Int. Cl.
*H04L 27/34* (2006.01)
*H04W 72/04* (2009.01)
(Continued)

(52) U.S. Cl.
CPC .......... *H04L 27/34* (2013.01); *H04L 5/0001* (2013.01); *H04L 27/3461* (2013.01);
(Continued)

(58) Field of Classification Search
CPC ...................................................... H04L 27/34
See application file for complete search history.

(56) References Cited

U.S. PATENT DOCUMENTS 7,729,232 B2 6/2010 Wang et al.
7,738,587 B2 6/2010 Chen et al.
(Continued)

FOREIGN PATENT DOCUMENTS

CN 101444060 A 5/2009
CN 102577582 A 7/2012
(Continued)

OTHER PUBLICATIONS

International Search Report, dated Jun. 3, 2015, in International Application No. PCT/CN2014/085551 (4 pp.).
(Continued)

*Primary Examiner* — Raj Jain
*Assistant Examiner* — Andrew C Lee
(74) *Attorney, Agent, or Firm* — Staas & Halsey LLP (57) ABSTRACT

The present invention discloses a solution including: receiving channel quality fed back by at least two user terminals; determining, according to the received channel quality fed back by the at least two user terminals, a user terminal that needs to be served by each transmit antenna of a base station device; for user terminals served by a same transmit antenna, configuring, according to channel quality fed back by the user terminals served by the same transmit antenna, a constellation expansion modulation scheme for each user terminal served by the same transmit antenna, and determining an intra-stream power allocation factor and an initial phase rotation coefficient of the transmit antenna; and processing, by using the modulation scheme, a signal to be sent to the user terminal, and transmitting the processed signal to the user terminal according to the intra-stream power allocation factor and the initial phase rotation coefficient.

10 Claims, 4 Drawing Sheets

(51) Int. Cl.
*H04L 5/00* (2006.01)
*H04W 88/08* (2009.01)

(52) U.S. Cl.
CPC ....... *H04L 27/3488* (2013.01); *H04W 72/042* (2013.01); *H04W 88/08* (2013.01)

(56) References Cited

U.S. PATENT DOCUMENTS

| | | | |
|---|---|---|---|
| 8,472,549 B2 | 6/2013 | Zhang et al. | |
| 8,842,542 B2* | 9/2014 | Zhang | H04W 52/12 370/236 |
| 2007/0195907 A1 | 8/2007 | Wang et al. | |
| 2007/0286238 A1 | 12/2007 | Wang et al. | |
| 2010/0322171 A1* | 12/2010 | Dekorsy | H04B 7/0621 370/329 |
| 2011/0003607 A1* | 1/2011 | Forenza | H04B 7/0413 455/501 |
| 2011/0080868 A1 | 4/2011 | Krishnaswamy et al. | |
| 2011/0103498 A1* | 5/2011 | Chen | H04L 1/06 375/260 |
| 2011/0159914 A1* | 6/2011 | Chen | H04W 52/362 455/522 |
| 2011/0319120 A1* | 12/2011 | Chen | H04W 52/367 455/522 |
| 2013/0034049 A1 | 2/2013 | Jia et al. | |
| 2014/0037029 A1* | 2/2014 | Murakami | H04L 27/34 375/340 |
| 2014/0045510 A1* | 2/2014 | Yue | H04W 72/042 455/450 |
| 2015/0312074 A1* | 10/2015 | Zhu | H04L 27/2627 370/329 |
| 2016/0119936 A1* | 4/2016 | Kim | H04J 11/0053 370/329 |
| 2016/0344525 A1* | 11/2016 | Kang | H04B 7/0469 |
| 2017/0013609 A1* | 1/2017 | Kim | H04L 5/0023 |
| 2017/0222860 A1* | 8/2017 | Noh | H04L 27/38 |

FOREIGN PATENT DOCUMENTS

| | | |
|---|---|---|
| CN | 102577587 A | 7/2012 |
| EP | 2182662 A1 | 5/2010 |

OTHER PUBLICATIONS

International Search Report dated Jun. 3, 2015, in International Application No. PCT/CN2014/085551 (4 pgs).

Tae-Kyoung Kim et al., "*User Scheduling and Adaptive Multilevel Modulation for SC-FDMA with Iterative Multiuser Detection,*" IEEE Communications Letters, vol. 15, No. 9, Sep. 2011, pp. 919-921.

Nuno Souto et al., "*Supporting M-QAM Hierarchical Constellations in HSDPA for MBMS Transmissions,*" Mobile and Wireless Communications Summit, Budapest, Hungary, Jul. 1-5, 2007.

Anass Benjebbour et al.: "Concept and Practical Considerations of Non-orthogonal Multiple Access(NOMA) for Future Radio Access," 2013 IEEE, Nov. 12, 2013, pp. 770-774, XP032541968.

Beomju Kim et al.: "Non-orthogonal Multiple Access in a Downlink Multiuser Beamforming System," 2013 IEEE Military Communications Conference, Nov. 18, 2013, pp. 1278-1283, XP032563628.

Extended European Search Report dated Jul. 28, 2017 in corresponding European Patent Application No. 14900987.0.

Office Action, dated Dec. 5, 2018, in Chinese Application No. 201480080665.6 (8 pp.).

\* cited by examiner

DATA TRANSMISSION METHOD AND DEVICE

CROSS-REFERENCE TEMPLATES

This application is a continuation of International Patent Application No. PCT/CN2014/085551, filed on Aug. 29, 2014, the disclosure of which is hereby incorporated by reference in its entirety.

TECHNICAL FIELD

The present invention relates to the field of wireless communications technologies, and in particular, to a data transmission method and device.

BACKGROUND

A multiple access manner refers to a manner in which simultaneous access of multiple user terminals is implemented on a specified radio resource. Common multiple access manners include manners such as time-division multiple access (English: Time-Division Multiple Access, TDMA for short), frequency-division multiple access (English: Frequency-Division Multiple Access, FDMA for short), code-division multiple access (English: Code-Division Multiple Access, CDMA for short), and orthogonal frequency-division multiple access (English: Orthogonal Frequency-Division Multiple Access, OFDMA for short).

Constellation expansion multiple access (English: Constellation Expansion Multiple Access, CEMA for short) is an access manner in which dam streams of multiple users are transmitted non-orthogonally and simultaneously in particular time and frequency domains by using a feature of higher-order constellation expansion. Specifically, a step for transmitting a signal between a user terminal and a base station device by using a constellation expansion multiple access technology includes:

For downlink data streams that need to be sent by a base station device to multiple user terminals, channel coding and random scrambling processing are separately performed on these downlink data streams, to obtain an information bit corresponding to each downlink data stream. Further, a transmission symbol corresponding to each information bit is determined. Obtained transmission symbols are superimposed, to form a higher-order transmission symbol, and the higher-order transmission symbol is transmitted to a user terminal by using a transmit antenna.

After receiving the higher-order transmission symbol, the user terminal performs balancing on the received higher-order transmission symbol according to a minimum mean square error criterion, and obtains, by means of soft demodulation, the downlink data streams sent by the base station device to the user terminal.

At present, for the constellation expansion multiple access manner, it is proposed that different error control levels on a same frequency are implemented by using a two-layer constellation expansion mode. It is also proposed that different channel coding is used for different users, and amplitude and phase adjustment is performed, to implement simultaneous transmission by multiple users. It is also proposed that in an independent modulation method for different modulation layer levels, a modulation symbol of each layer is superimposed based on reliability, and different users use different modulation layer levels in constellation expansion, and the like. However, in the currently proposed constellation expansion multiple access manner, when multi-user access is implemented by means of constellation expansion, the following problems still exist:

1. In a multi-user state, a problem that the constellation expansion does not match an antenna gain easily occurs in the current constellation expansion multiple access manner.

2. In a multi-user state, interference between data streams is relatively serious in the current constellation expansion multiple access manner, and therefore, signal transmission quality cannot be ensured.

SUMMARY

In view of this, embodiments of the present invention provide a data transmission method and device, to resolve existing problems that constellation expansion does not match an antenna gain and interference between data streams is relatively serious.

According to a first aspect of the present invention, a data transmission device is provided, including:

a receiving module, configured to receive channel quality fed back by at least two user terminals, where the channel quality is obtained by the user terminals by means of a signal feedback between receive antennas of the user terminals and a transmit antenna of a base station device;

a determining module, configured to: determine, according to the channel quality that is fed back by the at least two user terminals and that is received by the receiving module, a user terminal that needs to be served by each transmit antenna of the base station device; for user terminals served by a same transmit antenna, configure, according to channel quality fed back by the user terminals served by the same transmit antenna, a constellation expansion modulation scheme for each user terminal served by the same transmit antenna, and deter nine an ultra-stream power allocation factor and an initial phase rotation coefficient of each user terminal served by the transmit antenna; and a processing module, configured to: process, by using the modulation scheme determined by the determining module, a signal to be sent to the user terminal, and transmit the processed signal to the user terminal according to the intra-stream power allocation factor and the initial phase rotation coefficient of the transmit antenna that are determined by the determining module.

With reference to the first aspect of the present invention, in a first possible implementation manner, the data transmission device further includes:

a sending module, configured to send, by using a physical downlink control channel, transmit antenna information configured for a user terminal to the user terminal, where the transmit antenna information includes a number of a transmit antenna configured for the user terminal, an intra-stream power allocation factor and an initial phase rotation coefficient of the transmit antenna, and a constellation expansion modulation scheme configured for the user terminal.

With reference to the possible implementation manner of the first aspect of the present invention, or with reference to the first possible implementation manner of the first aspect of the present invention, in a second possible implementation manner, the determining module is specifically configured to: determine, for channel quality fed back by a user terminal, channel quality fed back for each transmit antenna in the channel quality fed back by the user terminal; and compare determined channel quality fed back for different transmit antennas;

select a transmit antenna from transmit antennas whose channel quality is greater than a specified threshold as a transmit antenna serving the user terminal; and when a transmit antenna serving each user terminal is determined for each user terminal, use at least one user terminal served by a same transmit antenna as a user terminal group that needs to be served by the transmit antenna.

With reference to the possible implementation manner of the first aspect of the present invention, or with reference to the first possible implementation manner of the first aspect of the present invention, or with reference to the second possible implementation manner of the first aspect of the present invention, in a third possible implementation manner, the determining module is specifically configured to: sort, according to strength of the channel quality, the channel quality fed back by the user terminals served by the same transmit antenna; and configure, according to a sorting result, the constellation expansion modulation scheme for each user terminal served by the same transmit antenna, where a larger value corresponding to channel quality indicates a higher priority of a modulation layer corresponding to a modulation scheme configured for a user terminal corresponding to the channel quality.

With reference to the possible implementation manner of the first aspect of the present invention, or with reference to the first possible implementation manner of the first aspect of the present invention, or with reference to the second possible implementation manner of the first aspect of the present invention, or with reference to the third possible implementation manner of the first aspect of the present invention, in a fourth possible implementation manner, the determining module is specifically configured to: compare channel quality fed back by different user terminals served by the same transmit antenna;

obtain, according to a comparison result, an intra-stream power allocation factor of a transmit signal of each user terminal served by the transmit antenna, where a larger value corresponding to channel quality indicates a larger value of an obtained intra-stream power allocation factor; and determine the initial phase rotation coefficient of each user terminal according to the constellation expansion modulation scheme configured for each user terminal.

With reference to the possible implementation manner of the first aspect of the present invention, or with reference to the first possible implementation manner of the first aspect of the present invention, or with reference to the second possible implementation manner of the first aspect of the present invention, or with reference to the third possible implementation manner of the first aspect of the present invention, or with reference to the fourth possible implementation manner of the first aspect of the present invention, in a fifth possible implementation manner, the data transmission device further includes an adjustment module, where the adjustment module is configured to: for a first transmit antenna and a second transmit antenna of the base station device, select a first user terminal from user terminals served by the first transmit antenna, and determine a first intra-stream power allocation factor of the first user terminal;

select a second user terminal from user terminals served by the second transmit antenna, and determine a second intra-stream power allocation factor of the second user terminal; and determine an adjusted first intra-stream power allocation factor and an adjusted second intra-stream power allocation factor in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J} |H_{2,j}^1|^2 \sum_{j=1}^{J} |H_{2,j}^3|^2}{\sum_{j=1}^{J} |H_{1,j}^1|^2 \sum_{j=1}^{J} |H_{1,j}^3|^2}} \end{cases},$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\Sigma_{j=1}^{J}|H_{2,j}^1|^2$ represents channel quality that is of a channel between the second transmit antenna of the base station device and that is measured by the first user terminal by using a receive antenna j; $\Sigma_{j=1}^{J}|H_{2,j}^3|^2$ represents channel quality that is of a channel between the second transmit antenna of the base station device and that is measured by the second user terminal by using the receive antenna j; $\Sigma_{j=1}^{J}|H_{1,j}^1|^2$ represents channel quality that is of a channel between the first transmit antenna of the base station device and that is measured by the first user terminal by using the receive antenna j; and $\Sigma_{j=1}^{J}|H_{2,j}^3|^2$ represents channel quality that is of a channel between the first transmit antenna of the base station device and that is measured by the second user terminal by using the receive antenna j, where a value of j ranges from 1 to J, and J is a positive integer whose value is greater than 1.

According to a second aspect of the present invention, a data transmission device is provided, including:

a detection module, configured to detect channel quality between a receive antenna and a transmit antenna that is of a base station device;

a sending module, configured to send the channel quality detected by the detection module to the base station device;

a receiving module, configured to receive a transmit signal and transmit antenna information that are sent by the base station device, where the transmit antenna information includes a number of a transmit antenna configured for a user terminal, an intra-stream power allocation factor and an initial phase rotation coefficient of the transmit antenna, and a constellation expansion modulation scheme configured for the user terminal; and a decoding module, configured to decode the received transmit signal by using the transmit antenna information, to obtain a decoded transmit signal.

With reference to the possible implementation manner of the second aspect, in a first possible implementation manner, the receiving module is specifically configured to receive the transmit antenna information in the following manner:

performing channel estimation on a downlink control channel, and determining the transmit antenna information carried in the downlink control channel.

With reference to the possible implementation manner of the second aspect of the present invention, or with reference to the first possible implementation manner of the second aspect of the present invention, in a second possible implementation manner, the decoding module is specifically configured to obtain the transmit signal of the terminal device on a modulation layer by means of decoding by using a minimum Euclidean distance or a successive interference cancellation method.

According to a third aspect of the present invention, a data transmission device is provided, including:

a signal receiver, configured to receive channel quality fed back by at least two user terminals, where the channel quality is obtained by the user terminals by means of a signal feedback between receive antennas of the user terminals and a transmit antenna of a base station device;

a processor, configured to: determine, according to the received channel quality fed back by the at least two user terminals, a user terminal that needs to be served by each transmit antenna of the base station device; for user terminals served by a same transmit antenna, configure, according to channel quality fed back by the user terminals served by the same transmit antenna, a constellation expansion modulation scheme for each user terminal served by the same transmit antenna, determine an intra-stream power allocation factor and an initial phase rotation coefficient of each user terminal served by the transmit antenna, and process a signal to be sent to the user terminal by using the modulation scheme; and a signal transmitter, configured to transmit the processed signal to the user terminal according to the intra-stream power allocation factor and the initial phase rotation coefficient of the transmit antenna.

With reference to the possible implementation manner of the third aspect of the present invention, in a first possible implementation manner, the signal transmitter is further configured to send, by using a physical downlink control channel, transmit antenna information configured for a user terminal to the user terminal, where the transmit antenna information includes a number of a transmit antenna configured for the user terminal, an intra-stream power allocation factor and an initial phase rotation coefficient of the transmit antenna, and a constellation expansion modulation scheme configured for the user terminal.

With reference to the possible implementation manner of the third aspect of the present invention, or with reference to the first possible implementation manner of the third aspect of the present invention, in a second possible implementation manner, the processor is specifically configured to: determine, for channel quality fed back by a user terminal, channel quality fed back for each transmit antenna in the channel quality fed back by the user terminal; and compare determined channel quality fed back for different transmit antennas:

select a transmit antenna from transmit antennas whose channel quality is greater than a specified threshold as a transmit antenna serving the user terminal; and when a transmit antenna serving each user terminal is determined for each user terminal, use at least one user terminal served by a same transmit antenna as a user terminal group that needs to be served by the transmit antenna.

With reference to the possible implementation manner of the third aspect of the present invention, or with reference to the first possible implementation manner of the third aspect of the present invention, or with reference to the second possible implementation manner of the third aspect of the present invention, in a third possible implementation manner, the processor is specifically configured to: sort, according to strength of the channel quality, the channel quality fed back by the user terminals served by the same transmit antenna; and configure, according to a sorting result, the constellation expansion modulation scheme for each user terminal served by the same transmit antenna, where a larger value corresponding to channel quality indicates a higher priority of a modulation layer corresponding to a modulation scheme configured for a user terminal corresponding to the channel quality.

With reference to the possible implementation manner of the third aspect of the present invention, or with reference to the first possible implementation manner of the third aspect of the present invention, or with reference to the second possible implementation manner of the third aspect of the present invention, or with reference to the third possible implementation manner of the third aspect of the present invention, in a fourth possible implementation manner, the processor is specifically configured to: compare channel quality fed back by different user terminals served by a same transmit antenna;

obtain, according to a comparison result, an intra-stream power allocation factor of a transmit signal of each user terminal served by the transmit antenna, where a larger value corresponding to channel quality indicates a larger value of an obtained intra-stream power allocation factor; and determine the initial phase rotation coefficient of each user terminal according to the constellation expansion modulation scheme configured for each user terminal.

With reference to the possible implementation manner of the third aspect of the present invention, or with reference to the first possible implementation manner of the third aspect of the present invention, or with reference to the second possible implementation manner of the third aspect of the present invention, or with reference to the third possible implementation manner of the third aspect of the present invention, or with reference to the fourth possible implementation manner of the third aspect of the present invention, in a fifth possible implementation manner, the processor is further configured to: for a first transmit antenna and a second transmit antenna of the base station device, select a first user terminal from user terminals served by the first transmit antenna, and determine a first intra-stream power allocation factor of the first user terminal;

select a second user terminal from user terminals served by the second transmit antenna, and determine a second intra-stream power allocation factor of the second user terminal; and determine an adjusted first intra-stream power allocation factor and an adjusted second intra-stream power allocation factor in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J} |H_{2,j}^1|^2 \sum_{j=1}^{J} |H_{2,j}^3|^2}{\sum_{j=1}^{J} |H_{1,j}^1|^2 \sum_{j=1}^{J} |H_{1,j}^3|^2}} \end{cases},$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\sum_{j=1}^{J} |H_{2,j}^1|^2$ represents channel quality that is of a channel between the second transmit antenna of the base station device and that is measured by the first user terminal by using a receive antenna j; $\sum_{j=1}^{J} |H_{2,j}^3|^2$ represents channel quality that is of a channel between the second transmit antenna of the base station device and that is measured by the second user terminal by using the receive antenna j; $\Sigma_{j=1}^{J}|H_{1,j}^{1}|^2$ represents channel quality that is of a channel between the first transmit antenna of the base station device and that is measured by the first user terminal by using the receive antenna j; and $\Sigma_{j=1}^{J}|H_{2,j}^{3}|^2$ represents channel quality that is of a channel between the first transmit antenna of the base station device and that is measured by the second user terminal by using the receive antenna where a value of ranges from 1 to J, and J is a positive integer whose value is greater than 1.

According to a fourth aspect of the present invention, a data transmission device is provided, including:

a processor, configured to detect channel quality between a receive antenna and a transmit antenna that is of a base station device;

a signal transmitter, configured to send the channel quality to the base station device; and a signal receiver, configured to receive a transmit signal and transmit antenna information that are sent by the base station device, where the transmit antenna information includes a number of a transmit antenna configured for a user terminal, an intra-stream power allocation factor and an initial phase rotation coefficient of the transmit antenna, and a constellation expansion modulation scheme configured for the user terminal, where the processor is further configured to decode the received transmit signal by using the transmit antenna information, to obtain a decoded transmit signal.

With reference to the possible implementation manner of the fourth aspect of the present invention, in a first possible implementation manner, the signal receiver is specifically configured to receive the transmit antenna information in the following manner:

performing channel estimation on a downlink control channel, and determining the transmit antenna information carried in the downlink control channel.

With reference to the possible implementation manner of the fourth aspect of the present invention, or with reference to the first possible implementation manner of the fourth aspect of the present invention, in a second possible implementation manner, the processor is specifically configured to obtain the transmit signal of the terminal device on a modulation layer by means of decoding by using a minimum Euclidean distance or a successive interference cancellation method.

According to a fifth aspect of the present invention, a data transmission method is provided, including:

receiving channel quality fed back by at least two user terminals, where the channel quality is obtained by the user terminals by means of a signal feedback between receive antennas of the user terminals and a transmit antenna of a base station device;

determining, according to the received channel quality fed back by the at least two user terminals, a user terminal that needs to be served by each transmit antenna of the base station device;

for user terminals served by a same transmit antenna, configuring, according to channel quality fed back by the user terminals served by the same transmit antenna, a constellation expansion modulation scheme for each user terminal served by the same transmit antenna, and determining an intra-stream power allocation factor and an initial phase rotation coefficient of each user terminal served by the transmit antenna; and processing, by using the modulation scheme, a signal to be sent to the user terminal, and transmitting the processed signal to the user terminal according to the intra-stream power allocation factor and the initial phase rotation coefficient of the transmit antenna.

With reference to the possible implementation manner of the fifth aspect of the present invention, in a first possible implementation manner, the method further includes:

sending, by using a physical downlink control channel, transmit antenna information configured for a user terminal to the user terminal, where the transmit antenna information includes a number of a transmit antenna configured for the user terminal, an intra-stream power allocation factor and an initial phase rotation coefficient of the transmit antenna, and a constellation expansion modulation scheme configured for the user terminal.

With reference to the possible implementation manner of the fifth aspect of the present invention, or with reference to the first possible implementation manner of the fifth aspect of the present invention, in a second possible implementation manner, the determining, according to the received channel quality fed back by the at least two user terminals, a user terminal that needs to be served by each transmit antenna of the base station device includes:

determining, for channel quality fed back by a user terminal, channel quality fed back for each transmit antenna in the channel quality fed back by the user terminal; and comparing determined channel quality fed back for different transmit antennas;

selecting a transmit antenna from transmit antennas whose channel quality is greater than a specified threshold as a transmit antenna serving the user terminal; and when a transmit antenna serving each user terminal is determined for each user terminal, using at least one user terminal served by a same transmit antenna as a user terminal group that needs to be served by the transmit antenna.

With reference to the possible implementation manner of the fifth aspect of the present invention, or with reference to the first possible implementation manner of the fifth aspect of the present invention, or with reference to the second possible implementation manner of the fifth aspect of the present invention, in a third possible implementation manner, the configuring, according to channel quality fed back by the user terminals served by the same transmit antenna, a constellation expansion modulation scheme for each user terminal served by the same transmit antenna includes:

sorting, according to strength of the channel quality, the channel quality fed back by the user terminals served by the same transmit antenna; and configuring, according to a sorting result, the constellation expansion modulation scheme for each user terminal served by the same transmit antenna, where a larger value corresponding to channel quality indicates a higher priority of a modulation layer corresponding to a modulation scheme configured for a user terminal corresponding to the channel quality.

With reference to the possible implementation manner of the fifth aspect of the present invention, or with reference to the first possible implementation manner of the fifth aspect of the present invention, or with reference to the second possible implementation manner of the fifth aspect of the present invention, or with reference to the third possible implementation manner of the fifth aspect of the present invention, in a fourth possible implementation manner, the determining, according to channel quality fed back by the user terminals served by the same transmit antenna, an intra-stream power allocation factor and an initial phase rotation coefficient of the transmit antenna includes:

comparing channel quality fed back by different user terminals served by the same transmit antenna;

obtaining, according to a comparison result, an intra-stream power allocation factor of a transmit signal of each user terminal served by the transmit antenna, where a larger value corresponding to channel quality indicates a larger value of an obtained intra-stream power allocation factor; and determining the initial phase rotation coefficient of each user terminal according to the constellation expansion modulation scheme configured for each user terminal.

With reference to the possible implementation manner of the fifth aspect of the present invention, or with reference to the first possible implementation manner of the fifth aspect of the present invention, or with reference to the second possible implementation manner of the fifth aspect of the present invention, or with reference to the third possible implementation manner of the fifth aspect of the present invention, or with reference to the fourth possible implementation manner of the fifth aspect of the present invention, in a fifth possible implementation mama, the method further includes:

for a first transmit antenna and a second transmit antenna of the base station device, selecting a first user terminal from user terminals served by the first transmit antenna, and determining a first intra-stream power allocation factor of the first user terminal;

selecting a second user terminal from user terminals served by the second transmit antenna, and determining a second intra-stream power allocation factor of the second user terminal; and determining an adjusted first intra-stream power allocation factor and an adjusted second intra-stream power allocation factor in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J}|H_{2,j}^1|^2 \sum_{j=1}^{J}|H_{2,j}^3|^2}{\sum_{j=1}^{J}|H_{1,j}^1|^2 \sum_{j=1}^{J}|H_{1,j}^3|^2}} \end{cases},$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\Sigma_{j=1}^{J}|H_{2,j}^1|^2$ represents channel quality that is of a channel between the second transmit antenna of the base station device and that is measured by the first user terminal by using a receive antenna j; $\Sigma_{j=1}^{J}|H_{2,j}^3|^2$ represents channel quality that is of a channel between the second transmit antenna of the base station device and that is measured by the second user terminal by using the receive antenna j; $\Sigma_{j=1}^{J}|H_{1,j}^1|^2$ represents channel quality that is of a channel between the first transmit antenna of the base station device and that is measured by the first user terminal by using the receive antenna j; and $\Sigma_{j=1}^{J}|H_{2,j}^3|^2$ represents channel quality that is of a channel between the first transmit antenna of the base station device and that is measured by the second user terminal by using the receive antenna where a value of ranges from 1 to J, and J is a positive integer whose value is greater than 1.

According to a sixth aspect of the present invention, a data transmission method is provided, including:

detecting channel quality between a receive antenna and a transmit antenna that is of a base station device;

sending the channel quality to the base station device;

receiving a transmit signal and transmit antenna information that are sent by the base station device, where the transmit antenna information includes a number of a transmit antenna configured for a user terminal, an intra-stream power allocation factor and an initial phase rotation coefficient of the transmit antenna, and a constellation expansion modulation scheme configured for the user terminal; and decoding the received transmit signal by using the transmit antenna information, to obtain a decoded transmit signal.

With reference to the possible implementation manner of the sixth aspect of the present invention, in a first possible implementation manner, the transmit antenna information is received in the following manner:

performing channel estimation on a downlink control channel, and determining the transmit antenna information carried in the downlink control channel.

With reference to the possible implementation manner of the sixth aspect of the present invention, or with reference to the first possible implementation manner of the sixth aspect of the present invention, in a second possible implementation manner, the decoding the received transmit signal by using the transmit antenna information, to obtain a decoded transmit signal includes:

obtaining the transmit signal of the terminal device on a modulation layer by means of decoding by using a minimum Euclidean distance or a successive interference cancellation method.

In the embodiments of the present invention, channel quality fed back by at least two user terminals is received, where the channel quality is obtained by the user terminals by means of a signal feedback between receive antennas of the user terminals and a transmit antenna of a base station device. A user terminal that needs to be served by each transmit antenna of the base station device is determined according to the received channel quality fed back by the at least two user terminals. For user terminals served by a same transmit antenna, a constellation expansion modulation scheme is configured for each user terminal served by the same transmit antenna according to channel quality fed back by the user terminals served by the same transmit antenna, and an intra-stream power allocation factor and an initial phase rotation coefficient of the transmit antenna are determined. A signal to be sent to the user terminal is processed by using the modulation scheme, and the processed signal is transmitted to the user terminal according to the intra-stream power allocation factor and the initial phase rotation coefficient of the transmit antenna. In this way, antenna interfaces and constellation expansion manners are properly configured for the user terminals by using the channel quality fed back by the user terminals. Simultaneous data transmission between the base station device and multiple user terminals in a multi-antenna environment is implemented in a constellation expansion multiple access manner. Data is transmitted to the user terminal according to the intra-stream power allocation factor and the initial phase rotation coefficient that are determined for the user terminal and that are of the transmit antenna, thereby effectively avoiding a problem that an intra-stream interference is relatively serious when different user terminals served by a same transmit antenna transmit data, so as to improve service quality of an antenna.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To implement an objective of the present invention, embodiments of the present invention provide a data transmission method and device. Channel quality fed back by at least two user terminals is received, where the channel quality is obtained by the user terminals by means of a signal feedback between receive antennas of the user terminals and a transmit antenna of a base station device. A user terminal that needs to be served by each transmit antenna of the base station device is determined according to the received channel quality fed back by the at least two user terminals. For user terminals served by a same transmit antenna, a constellation expansion modulation scheme is configured for each user terminal served by the same transmit antenna according to channel quality fed back by the user terminals served by the same transmit antenna, and an intra-stream power allocation factor and an initial phase rotation coefficient of the transmit antenna are determined. A signal to be sent to the user terminal is processed by using the modulation scheme, and the processed signal is transmitted to the user terminal according to the intra-stream power allocation factor and the initial phase rotation coefficient of the transmit antenna. In this way, antenna interfaces and constellation expansion manners are properly configured for the user terminals by using the channel quality fed back by the user terminals. Simultaneous data transmission between the base station device and multiple user terminals in a multi-antenna environment is implemented in a constellation expansion multiple access manner. Data is transmitted to the user terminal according to the intra-stream power allocation factor and the initial phase rotation coefficient that are determined for the user terminal and that are of the transmit antenna, thereby effectively avoiding a problem that an intra-stream interference is relatively serious when different user terminals served by a same transmit antenna transmit data, so as to improve service quality of an antenna.

It should be noted that in the embodiments of the present invention, to improve transmission efficiency in a multi-user and multi-antenna environment, a multi-antenna quality feedback module is added to a user terminal side, and a multi-antenna constellation expansion multiple access transmission module is added to a base station device side, so as to implement a multi-user and multi-antenna constellation expansion multiple access manner.

The following describes the embodiments of the present invention in detail with reference to accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
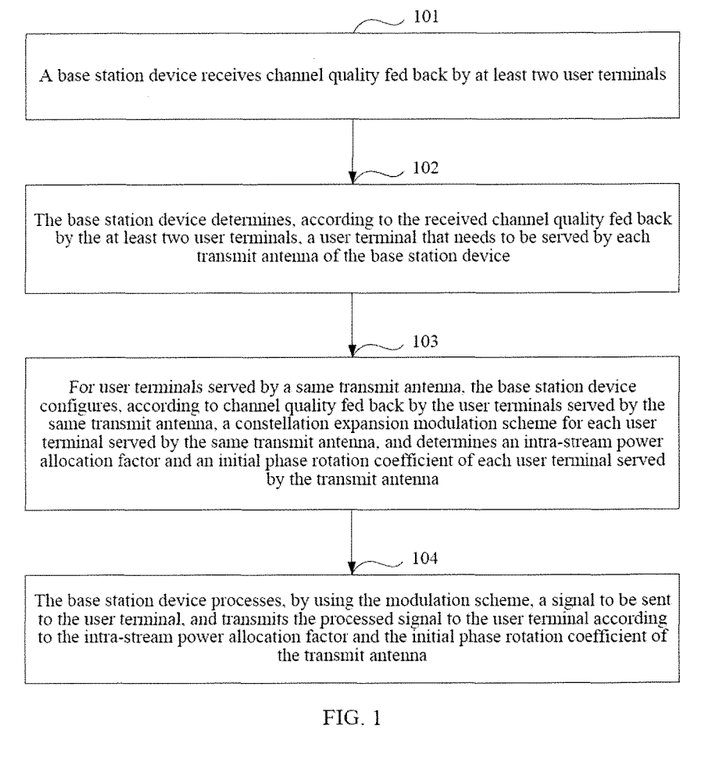
FIG. 1 is a schematic flowchart of a data transmission method according to Embodiment 1 of the present invention.

As shown in FIG. 1, FIG. 1 is a schematic flowchart of a data transmission method according to Embodiment 1 of the present invention. The method may be described as follows:

Step 101: A base station device receives channel quality fed back by at least two user terminals.

The channel quality is obtained by the user terminals by means of a signal feedback between receive antennas of the user terminals and a transmit antenna of a base station device.

In step 101, when enabling a multi-antenna constellation expansion transmission manner, the base station device sends a channel quality measurement request to an accessed user terminal, and instructs a user terminal receiving the channel quality measurement request to report measured channel quality.

For example, a user terminal K accesses the base station device, a sequence number of the transmit antenna of the base station device is i (where a value range of i is a positive integer eater than or equal to 1, for example, 8 or 16), and a receive antenna of the user terminal K is j (where a value range of j is a positive integer greater than or equal to 1, for example, 2, 4, 8, and 16), and in this case, channel quality reported by the user terminal K is obtained by using a quadratic sum of an information modulus value of a channel between the transmit antenna i of the base station device and the receive antenna j of the user terminal k.

That is, the channel quality may be represented as: $\Sigma_{j=1}^{J}|H_{i,j}^{K}|^2$, which represents the channel quality that is measured by the user terminal K and that is between the transmit antenna i and the base station device, where K represents a number of a user terminal, i represents a number of a transmit antenna of the base station device, and j represents a number of a receive antenna of the user terminal K.

Specifically, assuming that transmit antennas of the base station device include a transmit antenna 1 and a transmit antenna 2, the base station device receives channel quality fed back by multiple user terminals, for example, channel quality $\Sigma_{j=1}^{J}|H_{1,j}^{1}|^2$ fed back by a user terminal 1 for the transmit antenna 1; channel quality $\Sigma_{j=1}^{J}|H_{2,j}^{1}|^2$ fed back by the user terminal 1 for the transmit antenna 2; channel quality $\Sigma_{j=1}^{J}|H_{1,j}^{2}|^2$ fed back by a user terminal 2 for the transmit antenna 1; channel quality $\Sigma_{j=1}^{J}|H_{2,j}^{2}|^2$ fed back by the user terminal 2 for the transmit antenna 2; channel quality $\Sigma_{j=1}^{J}|H_{1,j}^{3}|^2$ fed back by a user terminal 3 for the transmit antenna 1; channel quality $\Sigma_{j=1}^{J}|H_{2,j}^{3}|^2$ fed back by the user terminal 3 for the transmit antenna 2; channel quality $\Sigma_{j=1}^{J}|H_{1,j}^{4}|^2$ fed back by a user terminal 4 for the transmit antenna 1; and channel quality $\Sigma_{j=1}^{J}|H_{2,j}^{4}|^{2}$ fed back by the user terminal 4 for the transmit antenna 2.

Step 102: The base station device determines, according to the received channel quality fed back by the at least two user terminals, a user terminal that needs to be served by each transmit antenna of the base station device.

In step 102, when receiving the channel quality fed back by the user terminals, the base station device compares channel quality feedback by a same user terminal for different transmit antennas, and determines a transmit antenna serving the user terminal according to a comparison result.

Specifically, for channel quality fed back by a user terminal, channel quality fed back for each transmit antenna is determined in the channel quality fed back by the user terminal.

The determined channel quality fed back for different transmit antennas is compared; and a transmit antenna is selected from transmit antennas whose channel quality is greater than a specified threshold as a transmit antenna serving the user terminal.

When a transmit antenna serving each user terminal is determined for each user terminal, at least one user terminal served by a same transmit antenna is used as a user terminal group that needs to be served by the transmit antenna.

For example, the channel quality $\Sigma_{j=1}^{J}|H_{1,j}^{1}|^{2}$ fed back by the user terminal 1 for the transmit antenna 1 is compared with the specified threshold, and the channel quality $\Sigma_{j=1}^{J}|H_{2,j}^{1}|^{2}$ fed back by the user terminal 1 for the transmit antenna 2 is compared with the specified threshold.

When $\Sigma_{j=1}^{J}|H_{1,j}^{1}|^{2}$ greater than the specified threshold and $\Sigma_{j=1}^{J}|H_{2,j}^{1}|^{2}$ is less than the specified threshold, it is determined that the transmit antenna 1 serves the user terminal 1. When $\Sigma_{j=1}^{J}|H_{1,j}^{1}|^{2}$ is less than the specified threshold and $\Sigma_{j=1}^{J}|H_{2,j}^{1}|^{2}$ is greater than the specified threshold, it is determined that the transmit antenna 2 serves the user terminal 1.

When $\Sigma_{j=1}^{J}|H_{1,j}^{1}|^{2}$ is greater than the specified threshold and $\Sigma_{j=1}^{J}|H_{2,j}^{1}|^{2}$ is greater than the specified threshold, a transmit antenna is selected from the transmit antenna 1 and the transmit antenna 2 as a transmit antenna serving the user terminal 1.

It should be noted that, the specified threshold may be determined according to an actual need, or may be determined according to experimental data, which is not limited herein.

Alternatively, the channel quality $\Sigma_{j=1}^{J}|H_{1,j}^{1}|^{2}$ fed back by the user terminal 1 for the transmit antenna 1 is compared with the channel quality $\Sigma_{j=1}^{J}|H_{2,j}^{1}|^{2}$ fed back by the user terminal 1 for the transmit antenna 2.

When $\Sigma_{j=1}^{J}|H_{1,j}^{1}|^{2}$ is greater than $\Sigma_{j=1}^{J}|H_{2,j}^{1}|^{2}$, it is determined that the transmit antenna 1 serves the user terminal 1.

When $\Sigma_{j=1}^{J}|H_{2,j}^{1}|^{2}$ is greater than $\Sigma_{j=1}^{J}|H_{1,j}^{1}|^{2}$, it is determined that the transmit antenna 2 serves the user terminal 1.

Similarly, transmit antennas respectively serving the user terminal 2, the user terminal 3, and the user terminal 4 are respectively determined for the user terminal 2, the user terminal 3, and the user terminal 4.

After a transmit antenna serving each user terminal is determined for each user terminal, the user terminal which is served by a same transmit antenna is used as a user group, that is, transmit antennas serving user terminals included in each user group are the same.

For example, if it is determined that the transmit antenna 1 serves the user terminal 1, it is determined that the transmit antenna 1 serves the user terminal 2, it is determined that the transmit antenna 2 serves the user terminal 3, and it is determined that the transmit antenna 2 serves the user terminal 4, the user terminal 1 and the user terminal 2 belong to a user group served by the transmit antenna 1 and the user terminal 3 and the user terminal 4 belong to a user group served by the transmit antenna 2.

Step 103: For user terminals served by a same transmit antenna, the base station device configures, according to channel quality fed back by the user terminals served by the same transmit antenna, a constellation expansion modulation scheme for each user terminal served by the same transmit antenna, and determines an intra-stream power allocation factor and an initial phase rotation coefficient of each user terminal served by the transmit antenna.

In step 103, a configuration manner of the modulation scheme is:

after grouping the user terminals, determining, by the base station device for the user terminals served by the same transmit antenna, the channel quality sent by the user terminals served by the same transmit antenna;

sorting, according to strength of the channel quality, the channel quality fed back by the user terminals served by the same transmit antenna; and configuring, according to a sorting result, the constellation expansion modulation scheme for each user terminal served by the same transmit antenna.

A larger value corresponding to channel quality indicates a higher priority of a modulation layer corresponding to a modulation scheme configured for a user terminal corresponding to the channel quality.

For example, for the user terminal 1 and the user terminal 2 that are served by the transmit antenna 1, the channel quality fed back by the user terminal 1 for the transmit antenna 1 is compared with the channel quality fed back by the user terminal 2 for the transmit antenna 1.

When the channel quality fed back by the user terminal 1 for the transmit antenna 1 is greater than the channel quality fed back by the user terminal 2 for the transmit antenna 1, a priority of a modulation layer corresponding to a modulation scheme configured for the user terminal 1 is higher than a priority of a modulation layer corresponding to a modulation scheme configured for the user terminal 2.

When the channel quality fed back by the user terminal 1 for the transmit antenna 1 is less than the channel quality fed back by the user terminal 2 for the transmit antenna 1, a priority of a modulation layer corresponding o a modulation scheme configured for the user terminal 1 is lower than a priority of a modulation layer corresponding to a modulation scheme configured for the user terminal 2.

Manners for determining an intra-stream power allocation factor are:

Manner 1:

comparing channel quality fed back by different user terminals served by a same transmit antenna: and obtaining, according to a comparison result, an intra-stream power allocation factor of a transmit signal of each user terminal served by the transmit antenna.

A larger value corresponding to channel quality indicates a larger value of an obtained intra-stream power allocation factor.

That is, a configured value relationship between intra-stream power allocation factors of transmit signals of different user terminals served by a same transmit antenna is determined. For example, an intra-stream power allocation factor of a transmit signal of the user terminal 1 is greater than an intra-stream power allocation factor of a transmit signal of the user terminal 2. If the intra-stream power allocation factor of the transmit signal of the user terminal 1 is 1, the intra-stream power allocation factor of the transmit signal of the user terminal 2 may be determined according to a value of $\Sigma_{j=1}^{J}|H_{1,j}^{1}|^{2}/\Sigma_{j=1}^{J}|H_{1,j}^{2}|^{2}$.

For another example, user terminals served by a same transmit antenna include the user terminal 1, the user terminal 2, and a user terminal 5, the intra-stream power allocation factor of the transmit signal of the user terminal 1 is greater than the intra-stream power allocation factor of the transmit signal of the user terminal 2, and the intra-stream power allocation factor of the transmit signal of the user terminal 1 is greater than an intra-stream power allocation factor of a transmit signal of the user terminal 5. If the intra-stream power allocation factor of the transmit signal of the user terminal 1 is 1, the intra-stream power allocation factor of the transmit signal of the user terminal 2 may be determined according to the value of $\Sigma_{j=1}^{J}|H_{1,j}^{1}|^{2}/\Sigma_{j=1}^{J}|H_{1,j}^{2}|^{2}$, and the intra-stream power allocation factor of the transmit signal of the user terminal 5 may be determined according to a value of $\Sigma_{j=1}^{J}|H_{1,j}^{1}|^{2}/\Sigma_{j=1}^{J}|H_{1,j}^{5}|^{2}$.

Manner 2:

obtaining, according to a modulation layer corresponding to a determined modulation scheme of each user terminal, an intra-stream power allocation factor of a transmit signal of each user terminal served by the transmit antenna.

A higher priority of a modulation layer corresponds to a larger value of an intra-stream power allocation factor.

A manner for determining an initial phase rotation coefficient is:

determining the initial phase rotation coefficient of each user terminal according to the constellation expansion modulation scheme configured for each user terminal.

Step 104: The base station device processes, by using the modulation scheme, a signal to be sent to the user terminal, and transmits the processed signal to the user terminal according to the intra-stream power allocation factor and the initial phase rotation coefficient of the transmit antenna.

In step 104, the base station device sends, by using a physical downlink control channel, transmit antenna information configured for a user terminal to the user terminal.

The transmit antenna information includes a number of a transmit antenna configured for the user terminal, an intra-stream power allocation factor and an initial phase rotation coefficient of the transmit antenna, and a constellation expansion modulation scheme configured for the user terminal.

Optionally, the method further includes:

after determining the intra-stream power allocation factor and the initial phase rotation coefficient of each user terminal served by the transmit antenna, adjusting, by the base station device, the intra-stream power allocation factor and the initial phase rotation coefficient of each user terminal according to channel quality of channels between the receive antenna and different transmit antennas of the base station device by using a method for maximizing a signal-to-noise ratio.

Specifically, for a first transmit antenna and a second transmit antenna of the base station device, a first user terminal is selected from user terminals served by the first transmit antenna, and a first intra-stream power allocation factor of the first user terminal is determined.

A second user terminal is selected from user terminals served by the second transmit antenna, and a second intra-stream power allocation factor of the second user terminal is determined.

An adjusted first intra-stream power allocation factor and an adjusted second intra-stream power allocation factor are determined in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J}|H_{2,j}^{1}|^{2}\sum_{j=1}^{J}|H_{2,j}^{3}|^{2}}{\sum_{j=1}^{J}|H_{1,j}^{1}|^{2}\sum_{j=1}^{J}|H_{1,j}^{3}|^{2}}} \end{cases},$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\Sigma_{j=1}^{J}|H_{2,j}^{1}|^{2}$ represents channel quality that is of a channel between the second transmit antenna of the base station device and that is measured by the first user terminal by using a receive antenna j; $\Sigma_{j=1}^{J}|H_{2,j}^{3}|^{2}$ represents channel quality that is of a channel between the second transmit antenna of the base station device and that is measured by the second user terminal by using the receive antenna j; $\Sigma_{j=1}^{J}|H_{1,j}^{1}|^{2}$ represents channel quality that is of a channel between the first transmit antenna of the base station device and that is measured by the first user terminal by using the receive antenna j; $\Sigma_{j=1}^{J}|H_{2,j}^{3}|^{2}$ represents channel quality that is of a channel between the first transmit antenna of the base station device and that is measured by the second user terminal by using the receive antenna j; and j represents a quantity of the receive antennas of the first user terminal or the second user terminal, where a value of j ranges from 1 to J, and J is a positive integer whose value is greater than 1.

It should be noted that a greater weight value indicates lower importance of the user terminal.

By means of the solution of Embodiment 1 of the present invention, channel quality fed back by at least two user terminals is received, where the channel quality is obtained by the user terminals by means of a signal feedback between receive antennas of the user terminals and a transmit antenna of a base station device. A user terminal that needs to be served by each transmit antenna of the base station device and an antenna gain of each transmit antenna are determined according to the received channel quality fed back by the at least two user terminals. For user terminals served by a same transmit antenna, a constellation expansion modulation scheme is configured for each user terminal served by the same transmit antenna according to channel quality fed back by the user terminals served by the same transmit antenna, and an intra-stream power allocation factor and an initial phase rotation coefficient of the transmit antenna are determined. A signal to be sent to the user terminal is processed by using the modulation scheme, and the processed signal is transmitted to the user terminal according to the intra-stream power allocation factor and the initial phase rotation coefficient of the transmit antenna. In this way, antenna interfaces and constellation expansion manners are properly configured for the user terminals by using the channel quality fed back by the user terminals. Simultaneous data transmission between the base station device and multiple user terminals in a multi-antenna environment is implemented in a constellation expansion multiple access manner. Data is transmitted to the user terminal according to the intra-stream power allocation factor and the initial phase rotation coefficient that are determined for the user terminal and that are of the transmit antenna, thereby effectively avoiding a problem that an intra-stream interference is relatively serious when different user terminals served by a same transmit antenna transmit data, so as to improve service quality of an antenna.

Embodiment 2

Figure 2:
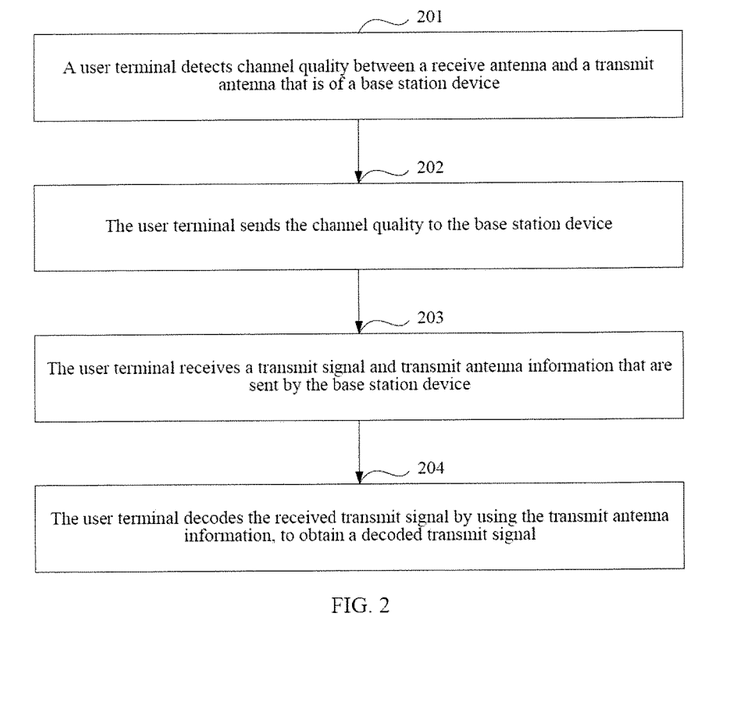
FIG. 2 is a schematic flowchart of a data transmission method according to Embodiment 2 of the present invention.

As shown in FIG. 2, FIG. 2 is a schematic flowchart of a data transmission method according to Embodiment 2 of the present invention. The method may be described as follows:

Step 201: A user terminal detects channel quality between a receive antenna and a transmit antenna that is of a base station device.

In step 201, when receiving a channel quality measurement request sent by the base station device, the user terminal measures the channel quality between the receive antenna of the user terminal and the transmit antenna of the base station device.

For example, a user terminal K accesses the base station device, a sequence number of the transmit antenna of the base station device is i (where a value range of i is a positive integer eater than or equal to 1, for example, 8 or 16), and a receive antenna of the user terminal K is j (where a value range of j is a positive integer greater than or equal to 1, for example, 2, 4, 8, and 16), and in this case, channel quality reported by the user terminal K is obtained by using a quadratic sum of an information modulus value of a channel between the transmit antenna i of the base station device and the receive antenna j of the user terminal k.

That is, the channel quality may be represented as: $\Sigma_{j=1}^{J}|H_{i,j}^{K}|^2$, which represents the channel quality that is measured by the user terminal K and that is between the transmit antenna i and the base station device, where K represents a number of a user terminal, i represents a number of a transmit antenna of the base station device, and j represents a number of a receive antenna of the user terminal K.

Step 202: The user terminal sends the channel quality to the base station device.

Step 203: The user terminal receives a transmit signal and transmit antenna information that are sent by the base station device.

The transmit antenna information includes a number of a transmit antenna configured for the user terminal, an intra-stream power allocation factor and an initial phase rotation coefficient of the transmit antenna, and a constellation expansion modulation scheme configured for the user terminal.

In step 203, the user terminal receives the transmit antenna information in the following manner:

performing channel estimation on a downlink control channel, and determining the transmit antenna information carried in the downlink control channel.

Step 204: The user terminal decodes the received transmit signal by using the transmit antenna information, to obtain a decoded transmit signal.

In step 204, the user terminal obtains the transmit signal of the terminal device on a modulation layer by means of decoding by using a minimum Euclidean distance or a successive interference cancellation method.

Embodiment 3

Figure 3:
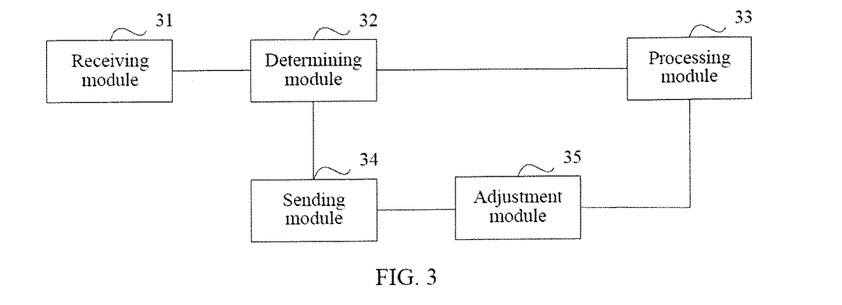
FIG. 3 is a schematic structural diagram of a data transmission device according to Embodiment 3 of the present invention.

As shown in FIG. 3, FIG. 3 is a schematic structural diagram of a data transmission device according to Embodiment 3 of the present invention. The data transmission device includes: a receiving module 31, a determining module 32, and a processing module 33.

The receiving module 31 is configured to receive channel quality fed back by at least two user terminals, where the channel quality is obtained by the user terminals by means of a signal feedback between the receive antennas of the user terminals and a transmit antenna of a base station device.

The determining module 32 is configured to: determine, according to the channel quality that is fed back by the at least two user terminals and that is received by the receiving module, a user terminal that needs to be served by each transmit antenna of the base station device; for user terminals served by a same transmit antenna, configure, according to channel quality fed back by the user terminals served by the same transmit antenna, a constellation expansion modulation scheme for each user terminal served by the same transmit antenna, and determine an intra-stream power allocation factor and an initial phase rotation coefficient of each user terminal served by the transmit antenna.

The processing module 33 is configured to: process, by using the modulation scheme determined by the determining module, a signal to be sent to the user terminal, and transmit the processed signal to the user terminal according to the intra-stream power allocation factor and the initial phase rotation coefficient of the transmit antenna that are determined by the determining module Optionally, the data transmission device further includes a sending module 34.

The sending module 34 is configured to send, by using a physical downlink control channel, transmit antenna information configured for a user terminal to the user terminal, where the transmit antenna information includes a number of a transmit antenna configured for the user terminal, an intra-stream power allocation factor and an initial phase rotation coefficient of the transmit antenna, and a constellation expansion modulation scheme configured for the user terminal.

Specifically, the determining module 32 is specifically configured to: determine, for channel quality fed back by a user terminal, channel quality fed back for each transmit antenna in the channel quality fed back by the user terminal; and compare determined channel quality fed back for different transmit antennas;

select a transmit antenna from transmit antennas whose channel quality is greater than a specified threshold as a transmit antenna serving the user terminal; and when a transmit antenna serving each user terminal is determined for each user terminal, use at least one user terminal served by a same transmit antenna as a user terminal group that needs to be served by the transmit antenna.

The determining module 32 is specifically configured to: sort, according to strength of the channel quality, the channel quality fed back by the user terminals served by the same transmit antenna; and configure, according to a sorting result, the constellation expansion modulation scheme for each user terminal served by the same transmit antenna, where a larger value corresponding to channel quality indicates a higher priority of a modulation layer corresponding to a modulation scheme configured for a user terminal corresponding to the channel quality.

The determining module 32 is specifically configured to: compare channel quality fed back by different user terminals served by the same transmit antenna;

obtain, according to a comparison result, an intra-stream power allocation factor of a transmit signal of each user terminal served by the transmit antenna, where a larger value corresponding to channel quality indicates a larger value of an obtained intra-stream power allocation factor; and determine the initial phase rotation coefficient of each user terminal according to the constellation expansion modulation scheme configured for each user terminal.

Optionally, the data transmission device further includes an adjustment module 35.

The adjustment module 35 is configured to: for a first transmit antenna and a second transmit antenna of the base station device, select a first user terminal from user terminals served by the first transmit antenna, and determine a first intra-stream power allocation factor of the first user terminal;

select a second user terminal from user terminals served by the second transmit antenna, and determine a second intra-stream power allocation factor of the second user terminal; and determine an adjusted first intra-stream power allocation factor and an adjusted second intra-stream power allocation factor in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J} |H_{2,j}^1|^2 \sum_{j=1}^{J} |H_{2,j}^3|^2}{\sum_{j=1}^{J} |H_{1,j}^1|^2 \sum_{j=1}^{J} |H_{1,j}^3|^2}} \end{cases},$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\Sigma_{j=1}^{J}|H_{2,j}^{1}|^2$ represents channel quality that is of a channel between the second transmit antenna of the base station device and that is measured by the first user terminal by using a receive antenna j; $\Sigma_{j=1}^{J}|H_{2,j}^{3}|^2$ represents channel quality that is of a channel between the second transmit antenna of the base station device and that is measured by the second user terminal by using the receive antenna j; $\Sigma_{j=1}^{J}|H_{1,j}^{1}|^2$ represents channel quality that is of a channel between the first transmit antenna of the base station device and that is measured by the first user terminal by using the receive antenna j; and $\Sigma_{j=1}^{J}|H_{2,j}^{1}|^3$ represents channel quality that is of a channel between the first transmit antenna of the base station device and that is measured by the second user terminal by using the receive antenna j, where a value of j ranges from 1 to J, and J is a positive integer whose value is greater than 1.

It should be noted that the data transmission device provided in Embodiment 3 of the present invention may be a logical component integrated in the base station device, or may be a network element device independent from the base station device, and may be implemented in a hardware manner, or may be implemented in a software manner. For example, in Embodiment 3 of the present invention, the data transmission device may be integrated in a multi-antenna constellation expansion multiple access module in the base station device.

The data transmission device properly configures antenna interfaces and constellation expansion manners for the user terminals by using the channel quality fed back by the user terminals, implements simultaneous data transmission between the base station device and multiple user terminals in a multi-antenna environment in a constellation expansion multiple access manner, and transmits data to the user terminals according to an intra-stream power allocation factor and an initial phase rotation coefficient of the transmit antenna and that are determined for the user terminals, thereby effectively avoiding a problem that an intra-stream interference is relatively serious when different user terminals served by a same transmit antenna transmit data, so as to improve service quality of an antenna.

Embodiment 4

Figure 4:
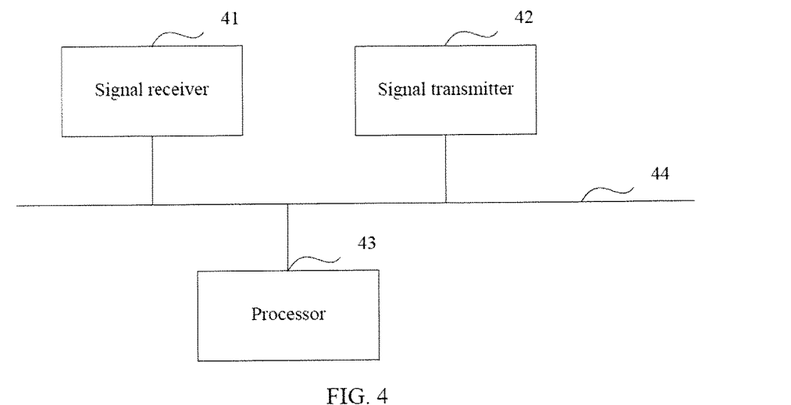
FIG. 4 is a schematic structural diagram of a data transmission device according to Embodiment 4 of the present invention.

As shown in FIG. 4, FIG. 4 is a schematic structural diagram of a data transmission device according to Embodiment 4 of the present invention. The data transmission device has a function of Embodiment 1 of the present invention. The data transmission device may use a structure of a general-purpose computer system, where the computer system may be specifically a computer based on a processor. The data transmission device entity includes: a signal receiver 41, at least one processor 42, and a signal transmitter 43. The signal receiver 41, the at least one processor 42, and the signal transmitter 43 are connected to each other by using a bus 44.

The processor 42 may be a general-purpose central processing unit (CPU), a microprocessor, an application-specific integrated circuit (application-specific integrated circuit, ASIC), or one or more integrated circuits configured to control a program to be executed in the solution of the present invention.

The signal receiver 41 is configured to receive channel quality fed back by at least two user terminals, where the channel quality is obtained by the user terminals by means of a signal feedback between receive antennas of the user terminals and a transmit antenna of a base station device.

The processor 42 is configured to: determine, according to the received channel quality fed back by the at least two user terminals, a user terminal that needs to be served by each transmit antenna of the base station device; for user terminals served by a same transmit antenna, configure, according to channel quality fed back by the user terminals served by the same transmit antenna, a constellation expansion modulation scheme for each user terminal served by the same transmit antenna, determine an intra-stream power allocation factor and an initial phase rotation coefficient of each user terminal served by the transmit antenna, and process a signal to be sent to the user terminal by using the modulation scheme.

The signal transmitter 43 is configured to transmit the processed signal to the user terminal according to the intra-stream power allocation factor and the initial phase rotation coefficient of the transmit antenna.

Specifically, the signal transmitter 43 is further configured to send, by using a physical downlink control channel, transmit antenna information configured for a user terminal to the user terminal, where the transmit antenna information includes a number of a transmit antenna configured for the user terminal, an intra-stream power allocation factor and an initial phase rotation coefficient of the transmit antenna, and a constellation expansion modulation scheme configured for the user terminal.

The processor 42 is specifically configured to: determine, for channel quality fed back by a user terminal, channel quality fed back for each transmit antenna in the channel quality fed back by the user terminal; and compare determined channel quality fed back for different transmit antennas;

select a transmit antenna from transmit antennas whose channel quality is greater than a specified threshold as a transmit antenna serving the user terminal; and when a transmit antenna serving each user terminal is determined for each user terminal, use at least one user terminal served by a same transmit antenna as a user terminal group that needs to be served by the transmit antenna.

The processor 42 is specifically configured to: sort, according to strength of the channel quality, the channel quality fed back by the user terminals served by the same transmit antenna; and configure, according to a sorting result, the constellation expansion modulation scheme for each user terminal served by the same transmit antenna, where a larger value corresponding to channel quality indicates a higher priority of a modulation layer corresponding to a modulation scheme configured for a user terminal corresponding to the channel quality.

The processor 42 is specifically configured to: compare channel quality fed back by different user terminals served by a same transmit antenna;

obtain, according to a comparison result, an intra-stream power allocation factor of a transmit signal of each user terminal served by the transmit antenna, where a larger value corresponding to channel quality indicates a larger value of an obtained intra-stream power allocation factor; and determine the initial phase rotation coefficient of each user terminal according to the constellation expansion modulation scheme configured for each user terminal.

The processor 42 is further configured to: for a first transmit antenna and a second transmit antenna of the base station device, select a first user terminal from user terminals served by the first transmit antenna, and determine a first intra-stream power allocation factor of the first user terminal;

select a second user terminal from user terminals served by the second transmit antenna, and determine a second intra-stream power allocation factor of the second user terminal; and determine an adjusted first intra-stream power allocation factor and an adjusted second intra-stream power allocation factor in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J}|H_{2,j}^1|^2 \sum_{j=1}^{J}|H_{2,j}^3|^2}{\sum_{j=1}^{J}|H_{1,j}^1|^2 \sum_{j=1}^{J}|H_{1,j}^3|^2}}, \end{cases}$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\Sigma_{j=1}^{J}|H_{2,j}^1|^2$ represents channel quality that is of a channel between the second transmit antenna of the base station device and that is measured by the first user terminal by using, a receive antenna j; $\Sigma_{j=1}^{J}|H_{2,j}^3|^2$ represents channel quality that is of a channel between the second transmit antenna of the base station device and that is measured by the second user terminal by using the receive antenna j; $\Sigma_{j=1}^{J}|H_{1,j}^1|^2$ represents channel quality that is of a channel between the first transmit antenna of the base station device and that is measured by the first user terminal by using the receive antenna j; and $\Sigma_{j=1}^{J}|H_{2,j}^3|^2$ represents channel quality that is of a channel between the first transmit antenna of the base station device and that is measured by the second user terminal by using the receive antenna j, where a value of j ranges from 1 to J, and J is a positive integer whose value is greater than 1.

The data transmission device properly configures antenna interfaces and constellation expansion manners for the user terminals by using the channel quality fed back by the user terminals, implements simultaneous data transmission between the base station device and multiple user terminals in a multi-antenna environment in a constellation expansion multiple access manner, and transmits data to the user terminals according to an intra-stream power allocation factor and an initial phase rotation coefficient of the transmit antenna and that are determined for the user terminals, thereby effectively avoiding a problem that an intra-stream interference is relatively serious when different user terminals served by a same transmit antenna transmit data, so as to improve service quality of an antenna.

Embodiment 5

Figure 5:
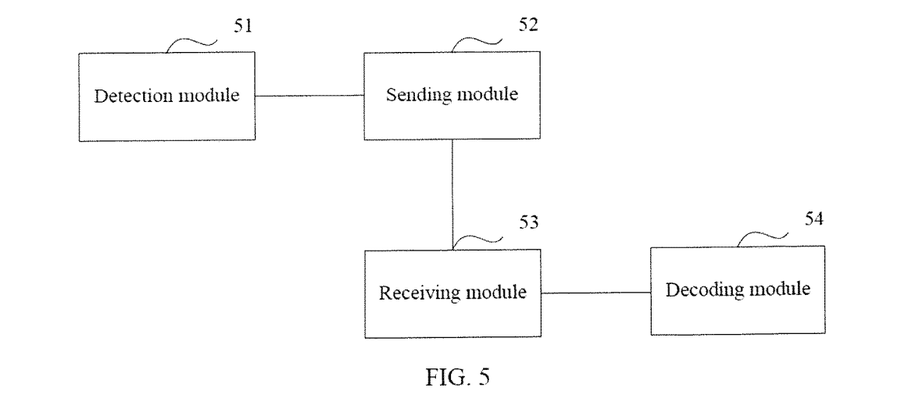
FIG. 5 is a schematic structural diagram of a data transmission device according to Embodiment 5 of the present invention.

As shown in FIG. 5, FIG. 5 is a schematic structural diagram of a data transmission device according to Embodiment 5 of the present invention. The data transmission device includes: a detection module 51, a sending module 52, a receiving module 53, and a decoding module 54.

The detection module 51 is configured to detect channel quality between a receive antenna and a transmit antenna that is of a base station device.

The sending module 52 is configured to send the channel quality detected by the detection module 51 to the base station device.

The receiving module 53 is configured to receive a transmit signal and transmit antenna information that are sent by the base station device, where the transmit antenna information includes a number of a transmit antenna configured for a user terminal, an intra-stream power allocation factor and an initial phase rotation coefficient of the transmit antenna, and a constellation expansion modulation scheme configured for the user terminal.

The decoding module 54 is configured to decode the received transmit signal by using the transmit antenna information, to obtain a decoded transmit signal.

Specifically, the receiving module 53 is further configured to receive the transmit antenna information in the following manner:

performing channel estimation on a downlink control channel, and determining the transmit antenna information carried in the downlink control channel.

The decoding module 54 is specifically configured to obtain the transmit signal of the terminal device on a modulation layer by means of decoding by using a minimum Euclidean distance or a successive interference cancellation method.

It should be noted that the data transmission device provided in Embodiment 5 of the present invention may be a logical component integrated in the user terminal, or may be a network element device independent from the user terminal, and may be implemented in a hardware manner, or may be implemented in a software manner. For example, in Embodiment 5 of the present invention, the data transmission device may be integrated in a multi-antenna quality feedback module in the user terminal.

Embodiment 6

Figure 6:
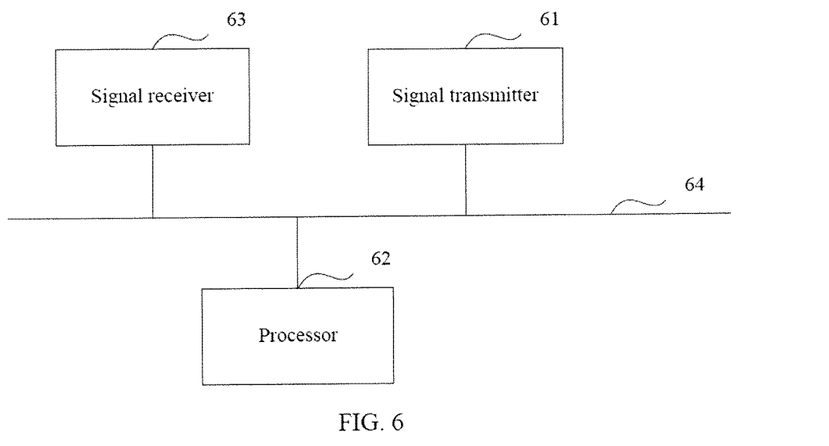
FIG. 6 is a schematic structural diagram of a data transmission device according to Embodiment 6 of the present invention.

As shown in FIG. 6, FIG. 6 is a schematic structural diagram of a data transmission device according to Embodiment 6 of the present invention. The data transmission device may use a structure of a general-purpose computer system, where the computer system may be specifically a computer based on a processor. The data transmission device entity includes: a signal transmitter 61, at least one processor 62, and a signal receiver 63. The signal transmitter 61, the at least one processor 62, and the signal receiver 63 are connected to each other by using a bus 64.

The processor 62 may be a general-purpose central processing unit (CPU), a microprocessor, an application-specific integrated circuit (application-specific integrated circuit, ASIC), or one or more integrated circuits configured to control a program to be executed in the solution of the present invention.

The processor 62 is configured to detect channel quality between a receive antenna and a transmit antenna that is of a base station device.

The signal transmitter 61 is configured to send the channel quality to the base station device.

The signal receiver 63 is configured to receive a transmit signal and transmit antenna information that are sent by the base station device, where the transmit antenna information includes a number of a transmit antenna configured for a user terminal, an intra-stream power allocation factor and an initial phase rotation coefficient of the transmit antenna, and a constellation expansion modulation scheme configured for the user terminal.

The processor 62 is further configured to decode the received transmit signal by using the transmit antenna information, to obtain a decoded transmit signal.

Specifically, the signal receiver 63 is further configured to receive the transmit antenna information in the following manner:

performing channel estimation on a downlink control channel, and determining the transmit antenna information carried in the downlink control channel.

The processor 62 is specifically configured to obtain the transmit signal of the terminal device on a modulation layer by means of decoding by using a minimum Euclidean distance or a successive interference cancellation method.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate all apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A data transmission device, comprising:
a signal receiver, configured to receive channel quality fed back by at least two user terminals, wherein the channel quality is obtained by the user terminals by means of a signal feedback between receive antennas of the user terminals and a transmit antenna of a base station device;
a processor, configured to: determine, according to the received channel quality fed back by the at least two user terminals, a user terminal that needs to be served by each transmit antenna of the base station device; for user terminals served by a same transmit antenna, configure, according to channel quality fed back by the user terminals served by the same transmit antenna, a constellation expansion modulation scheme for each user terminal served by the same transmit antenna, determine an intra-stream power allocation factor and an initial phase rotation coefficient of each user terminal served by the transmit antenna, and process a signal to be sent to the user terminal by using the modulation scheme; for a first transmit antenna and a second transmit antenna of the base station device, select a first user terminal from user terminals served by the first transmit antenna, and determine a first intra-stream power allocation factor of the first user terminal; select a second user terminal from user terminals served by the second transmit antenna, and determine a second intra-stream power allocation factor of the second user terminal; and determine an adjusted first intra-stream power allocation factor and an adjusted second intra-stream power allocation factor in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J} |H_{2,j}^1|^2 \sum_{j=1}^{J} |H_{2,j}^3|^2}{\sum_{j=1}^{J} |H_{1,j}^1|^2 \sum_{j=1}^{J} |H_{1,j}^3|^2}} \end{cases},$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\Sigma_{j=1}^{J}|H_{2,j}^1|^2$ represents channel quality that is of a channel between the second transmit antenna of the base station device and that is measured by the first user terminal by using a receive antenna j; $\Sigma_{j=1}^{J}|H_{2,j}^3|^2$ represents channel quality that is of a channel between the second transmit antenna of the base station device and that is measured by the second user terminal by using the receive antenna j; $\Sigma_{j=1}^{J}|H_{1,j}^1|^2$ represents channel quality that is of a channel between the first transmit antenna of the base station device and that is measured by the first user terminal by using the receive antenna j; and $\Sigma_{j=1}^{J}|H_{1,j}^3|^2$ represents channel quality that is of a channel between the first transmit antenna of the base station device and that is measured by the second user terminal by using the receive antenna j, where a value of j ranges from 1 to J, and J is a positive integer whose value is greater than 1; and a signal transmitter, configured to transmit the processed signal to the user terminal according to the intra-stream power allocation factor and the initial phase rotation coefficient of the transmit antenna.

2. The data transmission device according to claim 1, wherein
the signal transmitter is further configured to send, by using a physical downlink control channel, transmit antenna information configured for a user terminal to the user terminal, wherein the transmit antenna information comprises a number of a transmit antenna configured for the user terminal, an intra-stream power allocation factor and an initial phase rotation coefficient of the transmit antenna, and a constellation expansion modulation scheme configured for the user terminal.

3. The data transmission device according to claim 1, wherein
the processor is specifically configured to: determine, for channel quality fed back by a user terminal, channel quality fed back for each transmit antenna in the channel quality fed back by the user terminal; and compare determined channel quality fed back for different transmit antennas;

select a transmit antenna from corresponding transmit antennas whose channel quality is greater than a specified threshold as a transmit antenna serving the user terminal; and when a transmit antenna serving each user terminal is determined for each user terminal, use at least one user terminal served by a same transmit antenna as a user terminal group that needs to be served by the transmit antenna.

4. The data transmission device according to claim 1, wherein
the processor is specifically configured to: sort, according to strength of the channel quality, the channel quality fed back by the user terminals served by the same transmit antenna; and configure, according to a sorting result, the constellation expansion modulation scheme for each user terminal served by the same transmit antenna, wherein a larger value corresponding to channel quality indicates a higher priority of a modulation layer corresponding to a modulation scheme configured for a user terminal corresponding to the channel quality.

5. The data transmission device according to claim 1, wherein
the processor is specifically configured to: compare channel quality fed back by different user terminals served by a same transmit antenna;

obtain, according to a comparison result, an intra-stream power allocation factor of a transmit signal of each user terminal served by the transmit antenna, wherein a larger value corresponding to channel quality indicates a larger value of an obtained intra-stream power allocation factor; and determine the initial phase rotation coefficient of each user terminal according to the constellation expansion modulation scheme configured for each user terminal.

6. A method of data transmission, comprising:
receiving channel quality fed back by at least two user terminals, wherein the channel quality is obtained by the user terminals by means of a signal feedback between receive antennas of the user terminals and a transmit antenna of a base station device;

determining, according to the received channel quality fed back by the at least two user terminals, a user terminal that needs to be served by each transmit antenna of the base station device;

for user terminals served by a same transmit antenna, configuring, according to channel quality fed back by the user terminals served by the same transmit antenna, a constellation expansion modulation scheme for each user terminal served by the same transmit antenna, and determining an intra-stream power allocation factor and an initial phase rotation coefficient of each user terminal served by the transmit antenna; and processing, by using the modulation scheme, a signal to be sent to the user terminal, and transmitting the processed signal to the user terminal according to the intra-stream power allocation factor and the initial phase rotation coefficient of the transmit antenna;

for a first transmit antenna and a second transmit antenna of the base station device, selecting a first user terminal from user terminals served by the first transmit antenna, and determining a first intra-stream power allocation factor of the first user terminal;

selecting a second user terminal from user terminals served by the second transmit antenna, and determining a second intra-stream power allocation factor of the second user terminal; and determining an adjusted first intra-stream power allocation factor and an adjusted second intra-stream power allocation factor in the following manner:

$$\begin{cases} \alpha_1 + \alpha_3 = 1 \\ \dfrac{\alpha_1}{\alpha_3} = \sqrt[4]{\dfrac{\omega_3}{\omega_1} \cdot \dfrac{\sum_{j=1}^{J} |H_{2,j}^1|^2 \sum_{j=1}^{J} |H_{2,j}^3|^2}{\sum_{j=1}^{J} |H_{1,j}^1|^2 \sum_{j=1}^{J} |H_{1,j}^3|^2}} \end{cases},$$

where $\alpha_1$ is the adjusted first intra-stream power allocation factor; $\alpha_3$ is the adjusted second intra-stream power allocation factor; $\omega_1$ is a weight value for adjusting the first intra-stream power allocation factor; $\omega_3$ is a weight value for adjusting the second intra-stream power allocation factor; $\Sigma_{j=1}^{J}|H_{2,j}^1|^2$ represents channel quality that is of a channel between the second transmit antenna of the base station device and that is measured by the first user terminal by using a receive antenna j; $\Sigma_{j=1}^{J}|H_{2,j}^3|^2$ represents channel quality that is of a channel between the second transmit antenna of the base station device and that is measured by the second user terminal by using the receive antenna j; $\Sigma_{j=1}^{J}|H_{1,j}^1|^2$ represents channel quality that is of a channel between the first transmit antenna of the base station device and that is measured by the first user terminal by using the receive antenna j; and $\Sigma_{j=1}^{J}|H_{1,j}^3|^2$ represents channel quality that is of a channel between the first transmit antenna of the base station device and that is measured by the second user terminal by using the receive antenna j, where a value of j ranges from 1 to J, and J is a positive integer whose value is greater than 1.

7. The method according to claim 6, wherein the method further comprises:
sending, by using a physical downlink control channel, transmit antenna information configured for a user terminal to the user terminal, wherein the transmit antenna information comprises a number of a transmit antenna configured for the user terminal, an intra-stream power allocation factor and an initial phase rotation coefficient of the transmit antenna, and a constellation expansion modulation scheme configured for the user terminal.

8. The method according to claim 6, wherein the determining, according to the received channel quality fed back by the at least two user terminals, a user terminal that needs to be served by each transmit antenna of the base station device comprises:
determining, for channel quality fed back by a user terminal, channel quality fed back for each transmit antenna in the channel quality fed back by the user terminal; and comparing determined channel quality fed back for different transmit antennas;
selecting a transmit antenna from transmit antennas whose channel quality is greater than a specified threshold as a transmit antenna serving the user terminal; and
when a transmit antenna serving each user terminal is determined for each user terminal, using at least one user terminal served by a same transmit antenna as a user terminal group that needs to be served by the transmit antenna.

9. The method according to claim 6, wherein the configuring, according to channel quality fed back by the user terminals served by the same transmit antenna, a constellation expansion modulation scheme for each user terminal served by the same transmit antenna comprises:
sorting, according to strength of the channel quality, the channel quality fed back by the user terminals served by the same transmit antenna; and
configuring, according to a sorting result, the constellation expansion modulation scheme for each user terminal served by the same transmit antenna, wherein a larger value corresponding to channel quality indicates a higher priority of a modulation layer corresponding to a modulation scheme configured for a user terminal corresponding to the channel quality.

10. The method according to claim 6, wherein the determining, according to channel quality fed back by the user terminals served by the same transmit antenna, an intra-stream power allocation factor and an initial phase rotation coefficient of each user terminal served by the transmit antenna comprises:
comparing channel quality fed back by different user terminals served by the same transmit antenna;
obtaining, according to a comparison result, an intra-stream power allocation factor of a transmit signal of each user terminal served by the transmit antenna, wherein a larger value corresponding to channel quality indicates a larger value of an obtained intra-stream power allocation factor; and
determining the initial phase rotation coefficient of each user terminal according to the constellation expansion modulation scheme configured for each user terminal.

* * * * *

UNITED STATES PATENT AND TRADEMARK OFFICE
CERTIFICATE OF CORRECTION

PATENT NO. : 10,243,775 B2
APPLICATION NO. : 15/443187
DATED : March 26, 2019
INVENTOR(S) : Shunqing Zhang et al.

It is certified that error appears in the above-identified patent and that said Letters Patent is hereby corrected as shown below:

In the Claims

Column 25, Line 20:
In Claim 1, delete "where $\alpha_1$" and insert -- wherein $\alpha_1$ --, therefor.

Column 25, Line 41:
In Claim 1, after "antenna j," delete "where" and insert -- wherein --, therefor.

Column 27, Line 19:
In Claim 6, delete "where $\alpha_1$" and insert -- wherein $\alpha_1$ --, therefor.

Column 27, Line 39:
In Claim 6, after "antenna j," delete "where" and insert -- wherein --, therefor.

Signed and Sealed this
Thirty-first Day of December, 2019

Andrei Iancu
*Director of the United States Patent and Trademark Office*